Figure 1:
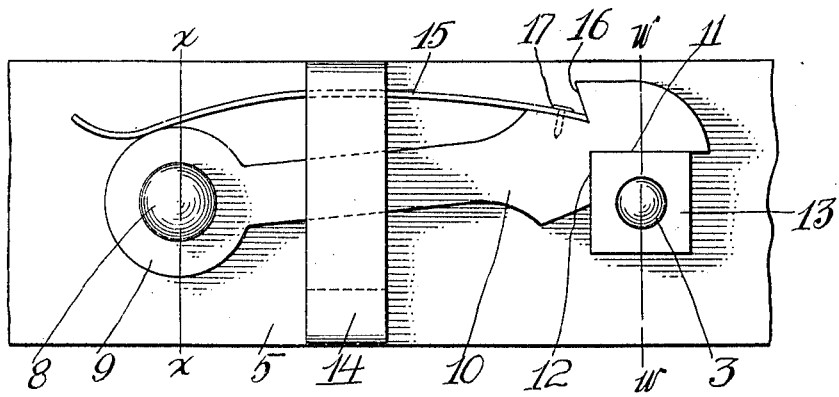

R. J. GRAY.
NUT LOCK.
APPLICATION FILED JAN. 12, 1910.

955,791.

Patented Apr. 19, 1910.

WITNESSES
Samuel Payne
R. H. Butler

INVENTOR
R. J. Gray,
BY
ATTORNEYS.

UNITED STATES PATENT OFFICE.

ROBERT J. GRAY, OF WALTERSBURG, PENNSYLVANIA.

NUT-LOCK.

955,791.  Specification of Letters Patent.  Patented Apr. 19, 1910.

Application filed January 12, 1910. Serial No. 537,639.

*To all whom it may concern:*

Be it known that I, ROBERT J. GRAY, a citizen of the United States of America, residing at Waltersburg, in the county of Fayette and State of Pennsylvania, have invented certain new and useful Improvements in Nut-Locks, of which the following is a specification, reference being had therein to the accompanying drawing.

This invention relates to nut locks, and the objects of my invention are to provide positive and reliable means for retaining a nut upon a bolt, and to provide a nut lock that can be advantageously used in connection with rail joints, bridges, rolling stock and structures subjected to vibrations, which have a tendency to displace nuts.

Other objects of my invention are to obviate the necessity of using spring washers and devices requiring a reconstruction of bolt and nut, and to furnish a nut lock that can be used numerous times without injuring the nut or bolt.

Further objects of the invention are to provide a nut lock that can be easily installed and manipulated by unskilled labor, and to accomplish the above results by a nut locking device that is simple in construction, durable and highly efficient for the purposes for which it is intended.

These and such other objects as may hereinafter appear are attained by a mechanical construction that will be hereinafter specifically described and then claimed.

Reference will now be had to the drawing, wherein:—

Figure 2:
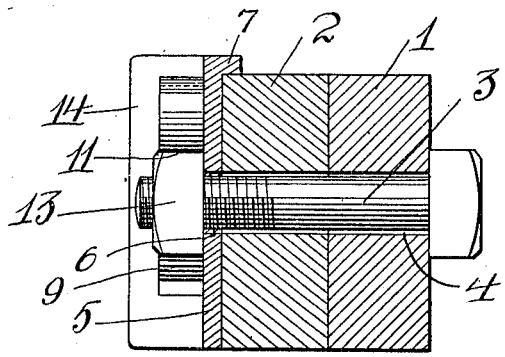
Figure 3:
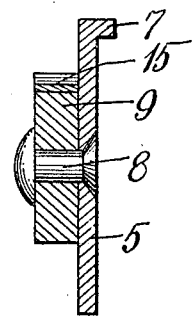

Figure 1 is a front elevation of a nut lock constructed in accordance with this invention, Fig. 2 is a vertical sectional view of the same taken on the line W—W of Fig. 1, and Fig. 3 is a similar view taken on the line X—X of Fig. 1.

In the accompanying drawing, the reference numerals 1 and 2 denote, by the way of example, two pieces of material adapted to be connected by a bolt 3 extending through registering openings provided therefor in the pieces of material 1 and 2.

5 denotes a plate having an opening 6 to receive the threaded end of the bolt 3, said plate having the upper edge thereof bent at right angles to form a flange 7 adapted to engage the upper edge of the piece of material 2 and prevent said plate from rotating or shifting relative to the piece of material 2 when placed against said material.

8 denotes a rivet or pin carried by the plate 5 at a point remote relatively to the protruding end of the bolt 3. Pivotally supported by the rivet or pin 8 is the enlarged apertured end 9 of a locking member 10, said locking member having the free end thereof cut away to provide gripping surfaces 11 and 12, the surface 11 being formed at right angles to the surface 12, whereby these surfaces can contact with the faces of a nut 13 screwed upon the threaded end of the bolt 3.

14 denotes a strap having the ends thereof suitably secured to the plate 5, and through this strap extends the locking member 10.

15 denotes a flat leaf spring arranged in the strap 14 and bearing against said strap, one end of said spring bearing upon the enlarged end 9 of the member 10, while the opposite end thereof is suitably secured in a notch 16 formed in the upper end of the member 10. A set screw or pin 17 can be used to an advantage for securing the spring to the locking member. The spring is adapted to normally maintain the locking member in engagement with the nut 13, and said locking member is adapted to prevent the nut from rotating relative to the bolt 3.

The plate 5 and the elements carried thereby are made of strong and durable metal and said plate can be made of a sufficient length to accommodate a plurality of the locking members as would be necessary when the nut lock is used in connection with a rail joint or structure having one or more bolts and nuts.

While in the drawing there is illustrated what I believe to be a practical embodiment of my invention, nevertheless, I reserve the right to make such changes in the structural elements as fall within the scope of the appended claims.

Having now described my invention what I claim as new, is:—

1. In a nut lock, the combination with pieces of material, a bolt extending through said material, and a nut adapted to screw upon said bolt, of a plate arranged upon said bolt between said nut and said material, a flange carried by the upper edge of said plate and adapted to extend over the upper edge of one of said pieces of material, a pivoted locking member carried by the outer face of said plate and adapted to engage the faces of said nut, a strap carried by said plate and adapted to limit the movement of said member, and a flat spring arranged in said strap and having one end thereof secured to the free end of said member and the opposite end bearing upon the pivoted end of said member.

2. In a nut lock, the combination with a bolt, and a nut adapted to screw thereon, of a plate mounted upon the bolt and engaged by the nut, a strap carried by said plate, a pivoted locking member carried by said plate and adapted to extend through said strap and engage said nut, and means carried by the free end of said member and engaging said strap and the pivoted end of said member for retaining said member in engagement with said nut.

In testimony whereof I affix my signature in the presence of two witnesses.

ROBERT J. GRAY.

Witnesses:
SAMUEL HAGAN,
AMADEE M. PRORAMER.